US006530448B2

(12) United States Patent
Abels et al.

(10) Patent No.: US 6,530,448 B2
(45) Date of Patent: Mar. 11, 2003

(54) RESTRAINT SYSTEM

(75) Inventors: Theodor Abels, Aschaffenburg (DE); Harald Will, Aschaffenburg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/784,539

(22) Filed: Feb. 14, 2001

(65) Prior Publication Data

US 2001/0017462 A1 Aug. 30, 2001

(30) Foreign Application Priority Data

Feb. 29, 2000 (DE) .......................... 100 09 549

(51) Int. Cl.⁷ .............................................. B60R 21/02
(52) U.S. Cl. .................... 180/271; 280/748; 296/190.03
(58) Field of Search ................................. 180/271, 281, 180/89.12; 280/748, 749, 753, 751; 296/190.01, 190.03, 190.11

(56) References Cited

U.S. PATENT DOCUMENTS

| 4,065,167 A | * | 12/1977 | Wright .......................... 175/219 |
| 4,388,980 A | * | 6/1983 | Vig et al. .................... 180/269 |
| 4,392,669 A | * | 7/1983 | Martin, Jr. ................ 180/89.12 |
| 4,619,479 A | * | 10/1986 | Martin, Jr. ................... 296/102 |
| 5,135,080 A | * | 8/1992 | Haston ......................... 187/222 |
| 5,286,081 A | * | 2/1994 | Martin, Jr. ................ 180/89.12 |
| 6,065,185 A | * | 5/2000 | Breed et al. ................... 16/337 |
| 6,189,954 B1 | * | 2/2001 | Martin, Jr. .............. 296/190.03 |
| D440,373 S | * | 4/2001 | Meinhardt .................... D34/34 |
| 6,299,207 B1 | * | 10/2001 | Bares .......................... 180/268 |

OTHER PUBLICATIONS

D. Elbracht, U. Weiner and G. Pfeiffer, Rückhaltesysteme Für Gabelstaplerfahrer, Sep. 30, 1998, cover and pp. 100–110.

* cited by examiner

Primary Examiner—Paul N. Dickson
Assistant Examiner—David R. Dunn
(74) Attorney, Agent, or Firm—Webb Ziesenheim Logsdon Orkin & Hanson, P.C.

(57) ABSTRACT

A restraint system for drivers of fork lift trucks with a driver's seat located in an open driver's cab includes a protective grate fastened to a protective roof of the driver's cab, which protective grate is pivotable around an axis of rotation that is located in the vicinity of the rear end of the driver's seat out of a closed position, which is approximately parallel to the driver's seat, outward into an open position. The protective grate can be fixed in the closed position. The protective grate may be retrofitted onto existing fork lift trucks, and can be operated very easily.

19 Claims, 2 Drawing Sheets

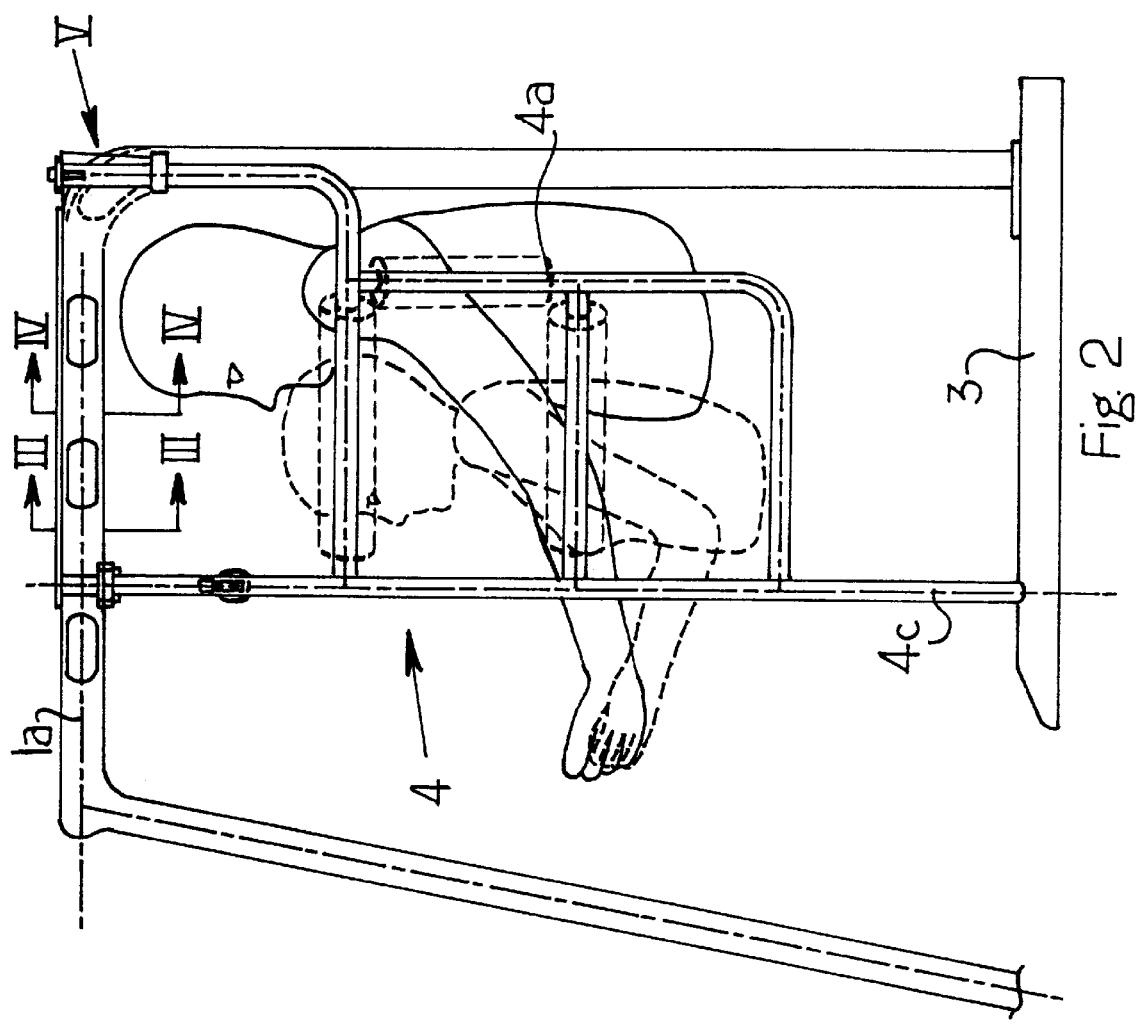
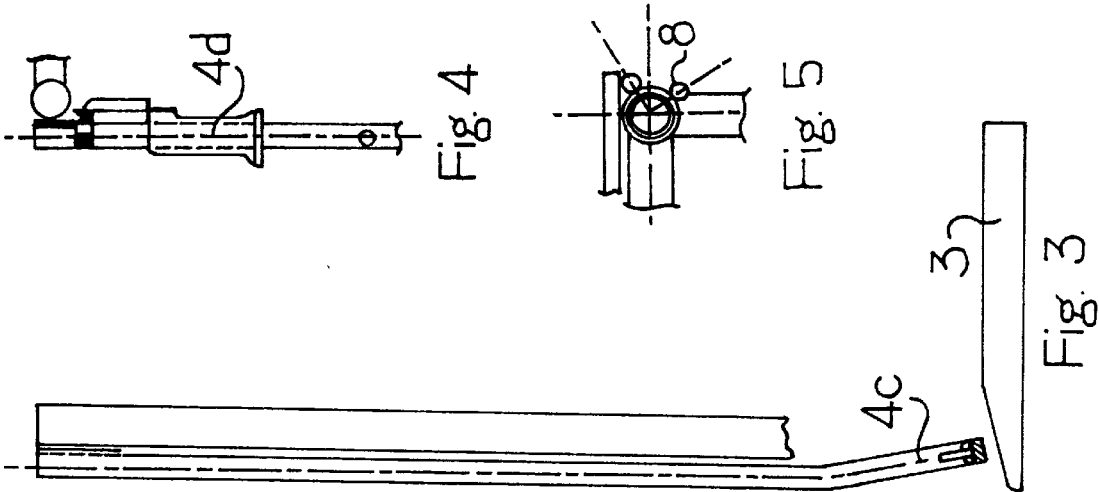

RESTRAINT SYSTEM

BACKGROUND OF THE INVENTION

1. Field of the Invention

The present invention relates to a restraint system for drivers of fork lift trucks with a driver's seat located in an open driver's cab.

2. Description of the Prior Art

To prevent serious injuries when a fork lift truck tips over, it is known in the prior art to equip the driver's seat with a lap belt. When used correctly, the lap belt prevents the driver from falling between the fork lift truck and the floor or road if the fork lift truck tips over. As a rule, however, this restraint system is frequently not used because drivers find it tedious to have to fasten and unfasten the belt every time they enter and exit the fork lift truck. When attached, moreover, the belt restricts the driver's freedom of movement on the driver's seat, e.g. when the truck is being operated in reverse and the driver turns around backward so that he can see where he is going. Moreover, one problem frequently encountered when retrofitting older fork lift trucks with lap belts is that the driver's seat is not designed for such retrofitting.

An object of the present invention is to make available an improved restraint system that can also be retrofitted on older fork lift trucks.

SUMMARY OF THE INVENTION

The present invention relates to a fork lift truck having, at least on one side of the driver's seat, a protective grate that is fastened to the protective roof of the driver's cab. The grate can be pivoted around an axis of rotation located in the vicinity of the rear end of the driver's seat out of a closed position in which it is approximately parallel to the driver's seat, outward into an open position. The protective grate can be fixed in the closed position. A protective grate of this type can be easily attached to an existing fork lift truck regardless of the configuration of the driver's seat, and is very easy to operate. Because the distance between the driver's seat and the protective roof of the driver's cab is largely the same on most common fork lift truck models, one standard model of the protective grate can be used for most different models of fork lift trucks.

For example, on a driver's seat that is to the left of center (i.e., standard location) generally all that is necessary is to equip only the left side of the fork lift truck with the restraint system of the present invention.

It is also possible, however, in particular when the driver's seat is located in the middle, to locate a protective grate on each side of the driver's seat.

In one advantageous refinement of the present invention, means are provided for the automatic closing of the protective grate.

The protective grate can be closed easily and automatically if there is at least one spring that pushes it toward the closed position.

The same effect is achieved if the axis of rotation is inclined slightly forward. The protective grate thereby moves toward the closed position under the force of gravity.

The protective grate can be locked manually to fix it in the closed position. It is also possible to achieve an automatic locking of the grate in a terminal position at the end of the closing process actuated by the device's own weight and/or under the force of a spring, e.g. by means of an easily operated spring-loaded latch.

It is preferable if the protective grate has a frame with a plurality of transverse struts. A protective grate of this type presents practically no interference with the driver's vision to the side. A grate of this type can also be manufactured easily and thus economically.

For safety reasons, it is advantageous if the frame and/or the transverse struts are located so that when the protective grate is closed, it is impossible for the driver to slide out sideways, and/or for the driver to extend his head out of the driver's cab.

In arrangements in which inside the driver's cab there is a hood on which the driver's seat is located, it is further advantageous if the protective grate has a support element that is effectively connected with the hood whereby when the protective grate is in the closed position, it is impossible to open the hood or the distance the hood can be opened is limited. This arrangement makes it impossible for the hood and any traction battery that may be located underneath it from moving an unacceptable distance toward the driver.

For an easy adaptation to different hood geometries, the support element is advantageously provided so that it can be adjusted and/or is spring-mounted.

In one advantageous embodiment of the invention, the protective grate can be locked in the closed position depending on whether the driver's position is occupied and whether a key switch is activated. To fix it in the closed position, the protective grate is not mechanically locked by hand, as described above, and by spring force, for example, but the protective grate is fixed in the closed position by an automatic locking device that is appropriately or operatively connected with a seat occupation switch and the (ignition) key switch.

To unlock the protective grate, it is not necessary to first extract the ignition key if the automatically locked protective grate can be unlocked by an additional switch element such as a push button.

To reduce the danger of injury in the event the fork lift truck tips over, the protective grate has damping means in the vicinity of the driver's shoulders, which damping means reduce the impact of the driver against the protective grate when the fork lift truck tips over. The damping means can be provided, for example, in the form of flexible or spring-mounted transverse struts or in the form of an upholstered pad.

Additional advantages and details of the invention are explained in greater detail below, with reference to the exemplary embodiments illustrated in the accompanying schematic drawings.

BRIEF DESCRIPTION OF THE DRAWINGS

FIG. 2 is a side view of one variant of the restraint system of the present invention;

FIG. 3 is a section along line III—III in FIG. 2;

FIG. 4 is a section along line IV—IV in FIG. 2; and

FIG. 5 is a plan view of the rear corner V of the restraint system illustrated in FIG. 2.

DETAILED DESCRIPTION OF THE PREFERRED EMBODIMENTS

Figure 1:
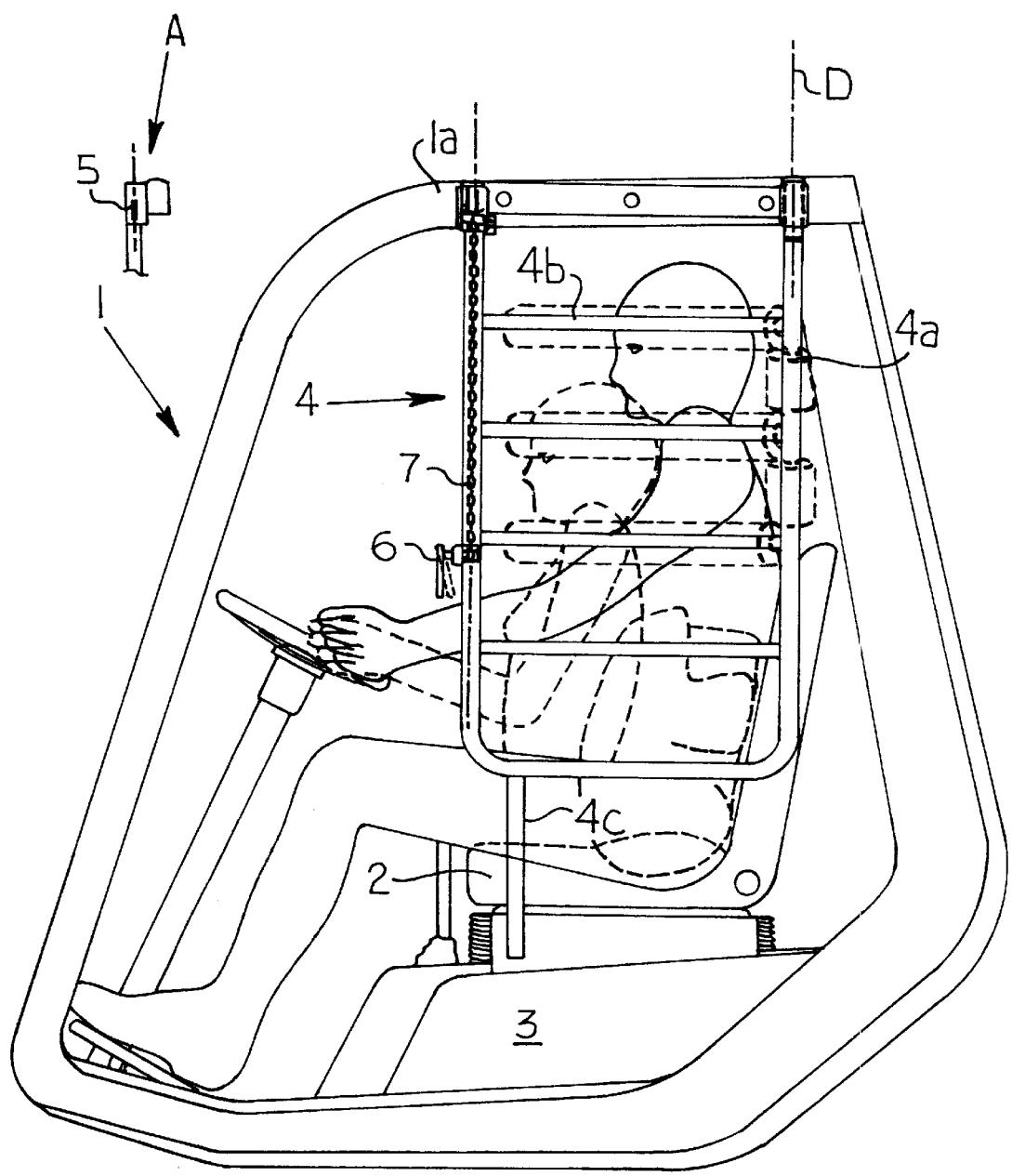
FIG. 1 is a side view of a restraint system of the present invention.

FIG. 1 is a side view of an open driver's cab of a fork lift truck. In the driver's cab there is a driver's seat 2 on a folding hood 3, under which there can be a traction battery, for example. The invention discloses that on protective roof 1a of driver's cab 1 there is a protective grate 4 that can pivot around an axis of rotation D that is located in a rear area out of a closed position, as shown in FIG. 1, in which it is approximately parallel to the driver's seat, outward into an open position. The protective grate 4 can be easily retrofitted on a fork lift truck by fastening it to a longitudinal member of the outer frame of the protective roof 1a of the driver's cab 1. Because the distance between the driver's seat 2 and the protective roof 1a of the driver's cab 1 is substantially the same on all common models of fork lift trucks, a standard embodiment of the protective grate 4 can be used for most different models of fork lift trucks.

The protective grate 4 should always be in the closed position when the driver is seated. The protective grate 4 must also be prevented from opening as the fork lift truck tips over. For this purpose, means can be provided for the automatic closing of the protective grate 4 and, further, the protective grate 4 can be fixed in the closed position.

An automatic closing of the protective grate 4 can be achieved, for example, by a spring force that pushes it toward the closed position. It is also possible to incline the axis of rotation D somewhat forward so that the weight of the protective grate 4 always pushes it toward the closed position.

The protective grate 4 can be manually locked to fix it in the closed position. It is also possible, at the end of the closing process affected by gravity and/or by a spring force, to automatically lock the protective grate 4 in an end position, e.g. by an easily operated spring-loaded latch 5, as illustrated in Detail A of FIG. 1. The grate 4 can then be opened by a lever 6, which is coupled with a linkage 7 which is effectively connected with the spring-loaded latch 5.

The protective grate 4 consists of a frame 4a, which in the exemplary embodiment shown is U-shaped, and a plurality of transverse struts 4b. This design presents practically no interference with the driver's view to the side, and is also easy and therefore economical to manufacture.

For safety reasons, the frame 4a and the transverse struts 4b are arranged so that when the protective grate 4 is closed, it is impossible for the driver to slip out sideways and/or to stick his head out of the driver's cab 1.

On the lower end of the frame 4a there can be a support element 4c, which is illustrated in broken lines in FIG. 1, which prevents the hood 3 from opening when the protective grate 4 is in the closed position or limits the distance the hood 3 can be opened. This measure prevents the hood 3 from opening up if the fork lift truck tips over, and prevents any traction battery that may be located underneath it from moving undesirably toward the driver and injuring him.

To facilitate adaptation to different hood geometries, the support element 4c is preferably provided so that it is adjustable and/or flexible.

To fix the protective grate 4 in the closed position, it is also possible to provide an automatic lock which is activated as a function of the occupation of the driver's seat 2, i.e. a seat occupation switch, and by the actuation of an (ignition) key switch.

So that it is not necessary to first extract the ignition key to open the locked protective grate 4, the protective grate 4 can also be unlocked by an additional switch element, such as a push button, for example, that can be activated by the driver.

To reduce the danger of injury to the driver if the fork lift truck tips over, the protective grate 4 can have damping means in the vicinity of the driver's shoulders. These damping means can be provided, for example, in the form of flexible transverse struts or in the form of upholstered pads.

A variant of the restraint system of the present invention is illustrated in FIG. 2 and differs from the embodiment illustrated in FIG. 1 in terms of the form of the frame 4a of the protective grate 4. In the embodiment illustrated in FIG. 2, the protective grate 4 is somewhat shorter in the rear area so that when the protective grate 4 is open, it does not interfere with the exchange or replacement of a traction battery that may be located underneath the hood 3.

FIG. 3 illustrates the support function of the support element 4c that is located on the protective grate 4, and by means of which the opening of the hood 3 is prevented when the protective grate 4 is in the closed position.

The protective grate 4 can be provided with a handle 4d for easy opening and closing. The handle 4d is shown in FIG. 4.

It is also advantageous if a stop 8 prevents the protective grate 4 from being opened beyond the 90-degree position. The stop 8 is shown in FIG. 5. In the absence of an automatic closing mechanism, this measure practically forces the driver to always close the protective grate 4 because otherwise the protective grate 4 extends out laterally beyond the contour of the vehicle, which is unacceptable when the vehicle is being driven, and would be substantially equivalent to driving an automobile with the doors open at right angles.

One feature common of the restraint systems described hereinabove is that in the closed position, the protective grate 4 prevents the driver from falling out, and nevertheless does not significantly restrict the driver's freedom of movement or vision because the protective grate 4 does not extend over the entire lateral area of the driver's cab, but only over the critical area parallel to the driver's seat, i.e. parallel to the driver.

While preferred embodiments of the present invention were described hereinabove, obvious modifications and alterations of the present invention may be made without departing from the spirit and scope of the present invention. The present invention is defined by the appended claims and equivalents thereto.

What is claimed is:

1. A restraint system for a driver of a forklift truck having a driver's seat located in an open driver' cab and having a protective roof including an outer frame with a substantially horizontal member extending longitudinally along a side of the truck, comprising on at least one side of the driver's seat a protective grate fastened to the substantially horizontal member of the protective roof of the driver's cab, which protective grate is pivotable around an axis of rotation located in the vicinity of the rear end of the driver's seat, and which protective grate is pivotable out of a closed position approximately parallel to the driver's seat outwardly to an open position, and wherein the protective grate can be fixed in the closed position.

2. The restraint system as claimed in claim 1, further comprising means for the automatic closing of the protective grate.

3. The restraint system as claimed in claim 2, wherein the means for automatic closing of the protective grate includes at least one spring configured to push the protective grate toward the closed position.

4. The restraint system as claimed in claim 3, wherein the axis of rotation is inclined toward a front end of the driver's cab.

5. The restraint system as claimed in claim 3, wherein the protective grate includes a frame with a plurality of transverse struts.

6. The restraint system as claimed in claim 2, wherein the axis of rotation is inclined toward a front end of the driver's cab.

7. The restraint system as claimed in claim 6, wherein the protective grate includes a frame with a plurality of transverse struts.

8. The restraint system as claimed in claim 2, wherein the protective grate includes a frame with a plurality of transverse struts.

9. The restraint system as claimed in claim 2, wherein the protective grate is configured to be automatically locked in the closed position as a function of the occupation of the driver's seat and the activation of a key switch.

10. The restraint system as claimed in claim 2, wherein the protective grate includes damping means located in the vicinity of the driver's shoulders when the driver is seated in the driver's seat.

11. The restraint system as claimed in claim 1, wherein the protective grate includes a frame with a plurality of transverse struts.

12. the restraint system as claimed in claim 11 wherein the frame and the transfer struts are located and oriented such that when the protective grate is closed the driver is restrained from sliding sideways out of the driver's cab, in such a way that the driver is prevented from extending his head outward from the driver's cab.

13. The restraint system as claimed in claim 1, wherein the protective grate includes damping means located in the vicinity of the driver's shoulders when the driver is seated in the driver's seat.

14. A restraint system for a driver of a forklift truck having a driver's seat located in an open driver's cab, wherein the driver's seat is located on a hood located within a driver's cab, and having a protective roof, comprising on at least one side of the driver's seat a protective grate fastened to the protective roof of the driver's cab, which protective grate is pivotable around an axis of rotation located in the vicinity of the rear end of the driver's seat, and wherein the protective grate is pivotable out of a closed position approximately parallel to the driver's seat outwardly into an open position, and wherein the protective grate can be fixed in the closed position, and wherein the protective grate includes a support element which is operatively connected with the hood such that in the closed position of the protective grate opening of the hood is prevented.

15. The restraint system as claimed in claim 14, wherein the support element is adjustable.

16. The restraint system as claimed in claim 14, wherein the support element is operatively connected with the hood such that in the closed position of the protective grate the distance the hood can be opened is limited.

17. the restraint system as claimed in claim 16, wherein the support element is flexible.

18. A restraint system for a driver of a forklift truck having a driver's seat located in an open driver's cab and having a protective roof, comprising on at least one side of the driver's seat a protective grate fastened to the protective roof of the driver's cab, which protective grate is pivotable around an axis of rotation located in the vicinity of the rear end of the driver's seat, in which a protective grate is pivotable out of a closed position approximately parallel to the driver's seat outward into an open position, wherein the protective grate is configured to be automatically locked in the closed position as a function of the occupation of the driver's seat and the activation of a key switch, and wherein the protective grate can be fixed in the closed position.

19. The restraint system as claimed in claim 18, wherein the automatically locked protective grate is configured to be unlocked by an additional switch element.

* * * * *

UNITED STATES PATENT AND TRADEMARK OFFICE
CERTIFICATE OF CORRECTION

PATENT NO. : 6,530,448 B2
DATED : March 11, 2003
INVENTOR(S) : Abels et al.

It is certified that error appears in the above-identified patent and that said Letters Patent is hereby corrected as shown below:

Column 5,
Line 24, "the restraint" should read -- The restraint --.

Column 6,
Line 17, "the restraint" should read -- The restraint --.

Signed and Sealed this

Eighth Day of July, 2003

JAMES E. ROGAN
*Director of the United States Patent and Trademark Office*